United States Patent Office 3,449,755
Patented June 10, 1969

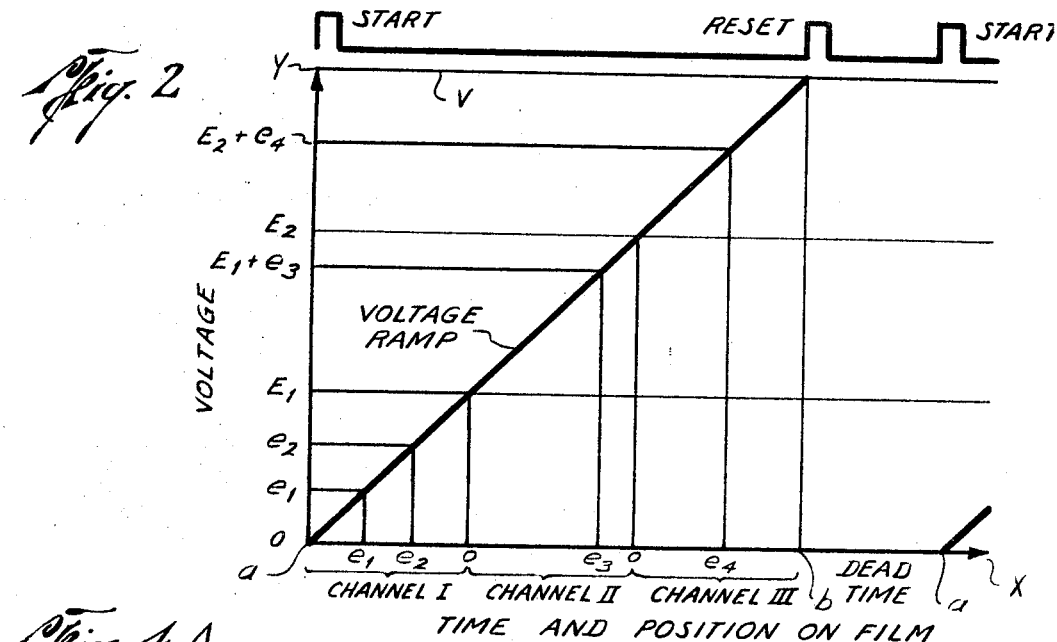
Fig. 2
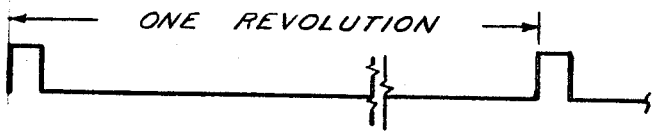
Fig. 4A — RESET BINARY COUNTER 56 AND REGISTERS
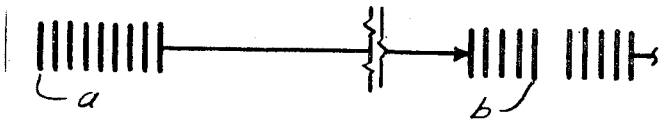
Fig. 4B — COUNT PULSES
Fig. 4C — GATE TO REGISTERS
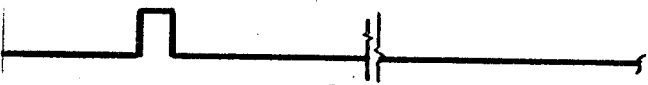
Fig. 4D — STEP TAPE RECORDER
Gyula L. Samodai
John S. Smith
INVENTORS
BY Edward M. Roney
ATTORNEY

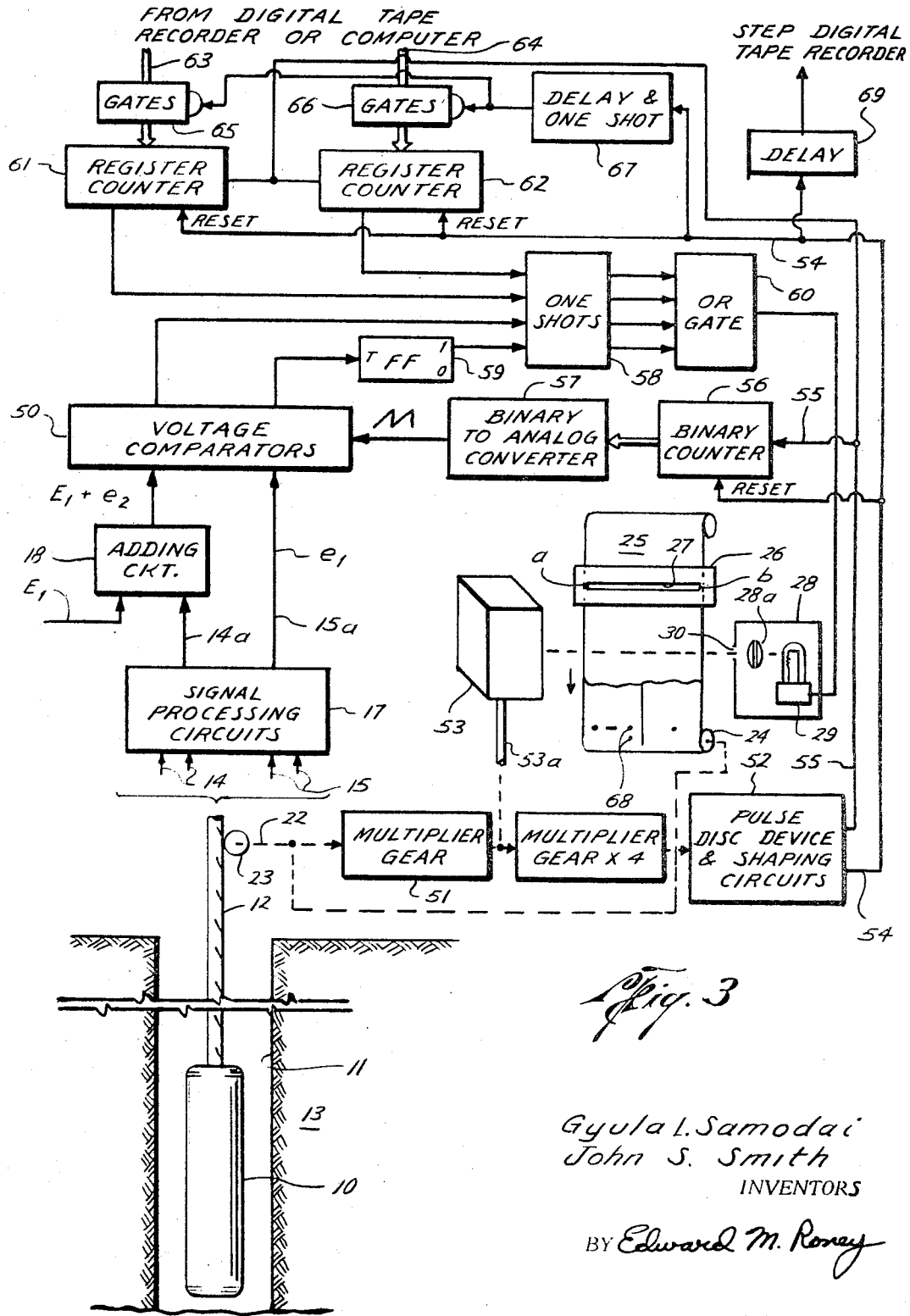

3,449,755
APPARATUS FOR RECORDING WELL LOGGING SIGNALS
Gyula L. Samodai, Danbury, Conn., and John S. Smith, London, England, assignors to Schlumberger Technology Corporation, New York, N.Y., a corporation of Texas
Filed Dec. 27, 1967, Ser. No. 693,894
Int. Cl. G01d 9/02
U.S. Cl. 346—33    11 Claims

ABSTRACT OF THE DISCLOSURE

In accordance with an illustrative embodiment of the invention, a rotatable mirror is disposed relative to a recording medium and light source and adapted to sweep the light from the light source across the recording medium. A ramp voltage proportional to the rotation of the rotatable mirror, and thus to the position of the light on the recording medium if the light source were to be energized, is generated to be compared with a plurality of well logging signals. When the ramp voltage is equal in magnitude to each one of the well logging signals, the light source is energized to place a mark on the recording medium. Means are shown for coding these marks placed on the recording medium for easy identification of the various well logging signals.

---

Figure 1:
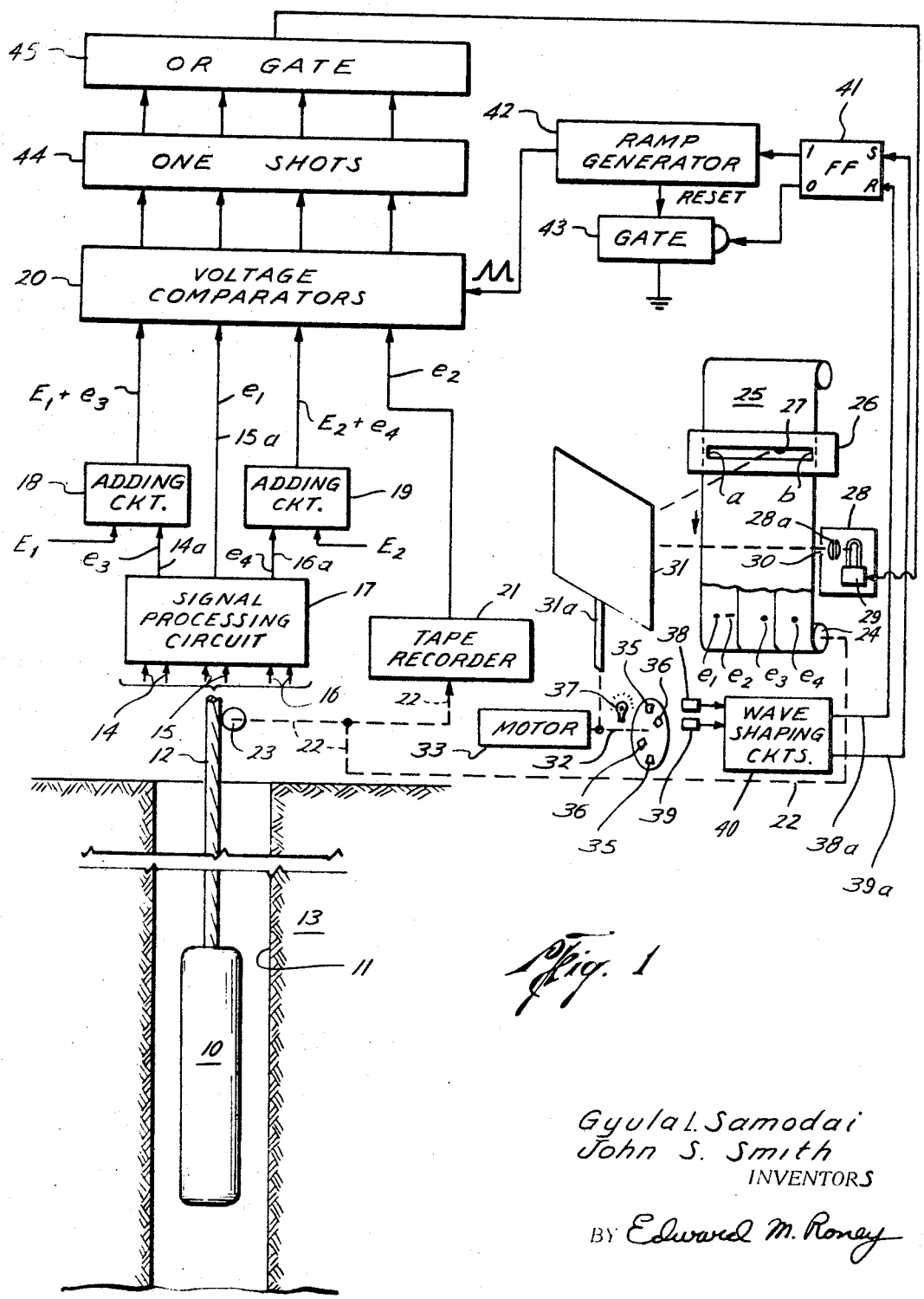

This invention relates to apparatus for recording well logging signals on a recording medium as a function of well depth. More particularly, the invention relates to recording of well logging data on photographic film. The invention is particularly useful for the recording of a plurality of well logging signals derived from various sources.

In the well logging art, a logging tool containing one or more exploring devices is lowered into a borehole drilled into the earth for measuring various properties of the subsurface earth formations adjacent the borehole. Such measurements are of considerable value in determining th presence and depth of hydrocarbon-bearing zones (oil, gas, etc.) that may exist in the subsurface earth formations. It is desirable in many instances to provide one or more visible logs of the investigated subsurface phenomena at the well site within a relatively short time after the log has been run. By so doing, decisions as to the presence of hydrocarbon-bearing zones can be determined rapidly at the well site.

In the past, visible log traces have been obtained by a galvanometer device where a galvanometer pen, for example, is continually adjusted as a function of the amplitude of the well logging data so that its position will always reflect the amplitude of the well logging data which it is desired to record. Another popular recording method is to continuously adjust the angular position of a mirror which reflects a beam of light onto a film, the angular position of the mirror determining the trace on the film.

However, when well logging data from more than one source is to be recorded, it is necessary to utilize a separate galvanometer device for each log which is to be recorded. Additionally, if it is desired to record more than one log on a single channel, the galvanometer devices must be displaced along the depth axis of the recording medium so that they will not conflict with one another, which requires the logs to be depth shifted with respect to one another by expensive memory devices.

It is becoming more the practice to convert one or more of the signals derived from the downhole investigating apparatus into digital form for utilization in a digital computer, or for recording on a digital magnetic tape recorder for subsequent read-out and computation. It would be desirable where the logging signals are in digital form to also have a visible analog record of the computed and uncomputed digital logs in many instances.

It is an object of the invention, therefore, to provide new and improved apparatus for recording well logging signals.

In accordance with the present invention, apparatus for recording well logging signals comprises means for deriving at least one signal representative of a measured characteristic of each formations traversed by a borehole, a recording medium adapted to be moved as a function of borehole depth, and a light source adapted to be energized. The apparatus further comprises a reflective means disposed relative to the light source and the recording medium so that the light from the light source will be adapted to impinge on the recording medium and means for rotating the reflective means so that the light from the light source, if present, will sweep across the recording medium. The apparatus further comprises means for generating a signal representative of the rotation of the reflective means and means for energizing the light source upon the generated signal attaining a given relationship with respect to the derived signal so as to provide a record of the derived signal on the recording medium.

For a better understanding of the present invention, together with other and further objects thereof, reference is had to the following description taken in connection wtih the accompanying drawings, the scope of the invention being pointed out in the appended claims.

Referring to the drawings:
FIGURE 1 shows an investigating apparatus in a borehole along with a schematic representation of one embodiment of apparatus for recording derived well logging signals;
FIGURE 2 shows a plot of voltage amplitude of the derived signals versus time;
FIGURE 3 shows another embodiment of recording derived well logging signals including signals in digital form; and
FIGURES 4a, 4b 4c and 4d show a time versus amplitude plot of electrical signals at various points in the FIGURE 3 apparatus.

Referring now to FIGURE 1, there is shown a downhole investigating apparatus 10 lowered into a borehole 11 on the end of a cable 12 for investigating earth formations 13 adjoining the borehole 11. The investigating apparatus 10 can comprise any type of exploring instrument that sends electrical signals to the surface of the earth, such as for example, those tools utilized in the logging services commonly known as electrical logging, sonic logging, nuclear logging, etc.

A plurality of conductor pairs 14, 15 and 16 are shown emanating from the end of the cable 12, which conductor pairs supply the well logging signals derived from the investigating apparatus 10 to the surface of the earth. These conductor pairs 14, 15 and 16 are supplied to signal processing circuits 17 which may take the form of the customary signal processing circuits associated with well logging. For example, the circuits may provide suitable amplification of the signals, impedance matching, and referencing the derived well logging signals to a suitable ground reference potential. If the derived signals are in the form of pulses, as is common in nuclear logging, these signal processing circuits may take the form of the customary pulse rate to amplitude converters.

The output conductors from signal processing circuits 17 are designated 14a, 15a and 16a to correspond with the conductor pairs 14, 15 and 16. The signals on conductors 14a, 15a and 16a are designated $e_3$, $e_1$ and $e_4$ respectively. The signals $e_3$ and $e_4$ on conductors 14a and 16a are supplied to suitable adding circuits 18 and 19 to which are also applied bias voltages $E_1$ and $E_2$ respectively. The signals $E_1+e_3$ and $E_2+e_4$ from adding circuits 18 and 19 and the well logging signal $e_1$ on conductor 15a are each supplied to a separate voltage comparator, which voltage comparators are represented by the block 20 designated "voltage comparators" in FIGURE 1. Also supplied to voltage comparators 20 is a well logging $e_2$ from a tape recorder 21 on which the well logging signals derived at an earlier time were recorded and are now played back in depth synchronization with the presently derived well logging signals. This depth synchronization is provided by a shaft 22 which is connected to a suitable rotating wheel 23 which is coupled to the cable 12 so as to rotate as a function of the movement of the cable 12 out of the borehole 11.

The shaft 22 is also connected to a reel-in device 24 which causes a recording medium 25, such as photographic film, to move as a function of depth. A suitable nontransparent plate 26 having a small slit 27 cut therein is situated over the film 25. A suitable light source device 28, which includes a flash tube device 29 and a lens 28a, provides light beams to pass through the aperture 30 of light source device whenever the flash tube device 29 is energized. These light beams are reflected off of the reflective surface of a mirror 31 which is located relative to the light source device 28 and recording medium 25 such that light beams reflected off of the mirror 31 will be focused through the slit 27 of the plate 26 onto the recording medium 25. The mirror 31, which has reflective surfaces on both sides thereof, is caused to continuously rotate by rotating a shaft 31a connected to the mirror 31. This rotation is provided through the action of a suitable rotatable shaft 32 driven by a constant speed motor 33. The speed of motor 33 is much greater than the movement of recording medium 25 such that the light beam reflected off of the mirror 31 will sweep across the recording medium 25 at a great rate compared to the movement of recording medium 25. While it has not been shown, it is to be understood that the mirror 31 could be held in place by any suitable joint on the top and/or bottom thereof, such as a ball joint attached to a fixed structure over the mirror 31.

The output shaft 32 from motor 33 is also supplied to a slotted disc 34 which has two tracks having two slots each. The slots of the outermost track are designated 35 and the slots of the inner track are designated 36. A light source 37 is situated on one side of the slotted disc 34 and a pair of photocells 38 and 39 are situated on the other side of the slotted disc so as to pick up the light beams from each of the two tracks whenever the slots 35 or 36 pass between the light source 37 and photocells 38 and 39. The output signals from photocells 38 and 39 are supplied to suitable wave-shaping circuits 40 which amplify and square-up the pulses from the photocells 38 and 39.

The photocell 39 which is responsive to the slots 36 on the inner track of the disc 34 provides a pulse on conductor 39a to the "set" input of a flip-flop 41 which supplies a constant voltage to a suitable ramp generator 42 which could comprise, for example, a standard integrator circuit. The current supplied to the integrating capacitor of ramp generator 42 should be substantially constant which could be accomplished by flip-flop 41 itself having a substantially high output impedance, or the capacitor within ramp generator 42 could be fed from a suitable constant current high output impedance device, such as an emitter follower. The photocell 38 which is responsive to the slots 35 on the outer periphery of the disc 34 provides a pulse on the conductor 38a to the reset input of flip-flop 41 which removes the voltage on the "1" output thereof supplied to ramp generator 42. The "0" output of flip-flop 41 energizes a suitable gate circuit 43 which discharges the capacitor of ramp generator 42. Thus, a sawtooth wave will be generated from ramp generator 42 with the pulses on conductor 39a causing the voltage to begin rising and the pulses on conductor 38a causing the voltage to drop abruptly to zero.

The slots on the slotted disc 34 are synchronized with the rotation of rotating mirror 31 so that photocell 39 which causes the flip-flop 41 to supply the constant voltage to the ramp generator 42 will be energized when the rotating mirror 31 is in a position such that if the flash tube 29 were energized, the light beam would be directed to the far left side of the slit 27, designated a. In like fashion, the slots 35 on the outer periphery of slotted disc 34 are synchronized with the mirror 31 such that photocell 38 will become energized at a time when the light beam, if present, would be at the far right side of slit 27, designated b. Thus, it can be seen that as the rotating mirror 31 rotates so as to pass the light beam, if present, across the width of film 25, a voltage is built up on ramp generator 42 and supplied to the voltage comparators 20.

The individual voltage comparators 20 act to generate a signal when the ramp voltage from ramp generator 42 equals the voltage of the well logging signals applied thereto. The output signal from each one of the four voltage comparators 20 energizes a selected one-shot of four parallel one-shots, that is, each one of the four parallel voltage comparators has an output lead supplied to one of the four one-shots. The output signals from one-shots 44 are supplied through an OR gate 45 whose output is utilized to energize flash tube 29.

Referring now to FIGURE 2, there is shown a plot of voltage versus time. The voltages of the signals applied to voltage comparators 20 are represented on the Y axis. The voltage ramp from ramp generator 42 is shown rising in a linear fashion. Now, by projecting the voltages on the Y axis off of the voltage ramp onto the X axis, the time at which the magnitude of the voltage ramp is equal to the applied voltage to comparators 20 can be found. Since the mirror 31 is rotating at a constant speed, the time scale on the X axis will also represent the position on the recording medium 25. Thus, the X axis represents the amplitude scale (width) of recording medium 25 (i.e. the X axis can be looked upon as the portion of recording medium 25 exposed through slit 27 of plate 26). The X axis is broken down into portions designated Channel I, Channel II, Channel III, and "dead time." Channel I includes voltages between O and $E_1$, Channel II represents voltages between $E_1$ and $E_2$, and Channel III represents voltages between $E_2$ and V (V being the maximum voltage attained). There are shown on the Y axis the signal voltages $e_1$, $e_2$, $E_1+e_3$ and $E_2+e_4$ which are applied to voltage comparators 20. At the top of FIGURE 2, there are shown the pulses on conductors 38a and 39a from wave-shaping circuit 40.

Now referring to FIGURES 1 and 2 in conjunction, the first pulse, designated "start," at the left side of FIGURE 2 causes flip-flop 41 to supply the constant voltage to ramp generator 42. The timing of this start pulse represents the angular position of rotating mirror 31 corresponding to the point a, i.e., at the far left side of the recording medium 25. This point a is shown on the X axis of FIGURE 2. Now, as mirror 31 rotates thus causing the beam of light, if present, to sweep across the recording medium 25, the voltage from ramp generator 42 increases linearly in direct relation to the position of the beam of light, if present, on the recording medium 25. The reset pulse, on the other hand, causes the ramp generator 42 to reset to zero volts, as shown in FIGURE 2, at the recording medium position designated b.

Now following a cycle of this operation, when the angular position of the rotating mirror 31 is such that if a light beam were generated, it would strike the point a on the film, the start pulse is generated to the set input of the flip-flop 41 causing the voltage output from ramp generator 42 to begin increasing. When the ramp voltage reaches the voltage level $e_1$, the voltage comparator which is connected to conductor 15a causes a signal to be applied to one-shot 44 which causes the flash tube 29 to become energized for a short time interval thus leaving a short duration trace on the film 25 at this point. Next, the ramp voltage reaches the voltage level $e_2$ corresponding to the well logging signal from tape recorder 21, which again causes the corresponding voltage comparator to energize one of the one-shots 44 and again flash the flash tube 29 thus leaving an exposed portion on the recording medium 25 at the point designated $e_2$ on the X axis of FIGURE 2. Next, the ramp voltage reaches the level $E_1+e_3$, thus causing an exposed portion on the film at the point designated $e_3$ on the X axis of FIGURE 2 in the same manner. This same thing occurs for the signal $e_4$. Since the bias voltages $E_1$ and $E_2$, in actuality, correspond to zero amplitude of Channels II and III, the corresponding positions on the X axis are designated 0 and the signals within Channels II and III on the X axis are designated $e_3$ and $e_4$.

Now, when the mirror 31 has rotated the beam of light, if present, to the position designated b, the reset pulse shown at the top of FIGURE 2 resets the voltage output from ramp generator 42 to zero volts as discussed earlier. The start pulse of flip-flop 41 is not generated for a short "dead time" interval which allows for the mirror 31 to rotate to the point where the beam of light, if present, would be at the point a on the recording medium. This process is continuously repeated over and over again.

In the case of several logs being recorded on the same channel, as shown in Channel I, FIGURE 1, it would be desirable to utilize some form of coding to separately designate each log. This can readily be accomplished by changing the on time or pulse duration of selected one-shots which supply the pulse to flash tube 29. This is shown in FIGURE 1 on the lower portion of the recording medium 25, which shows how the exposed portion would look, after developing, due to one sweep across the recording medium. The signal $e_2$ is shown having a wider exposed portion than the other signals, its one-shot having a greater pulse width.

It is sometimes difficult to vary the flash time of certain flash tubes. However, a glow modulator tube such as the Sylvania GM 514 could be utilized for this purpose. The glow modulator tube will change between red and blue light depending on the voltage applied, and if suitable light filtering or color selective developing were utilized, the desired results could be obtained. Additionally, such glow modulator tubes usually provide greater frequency response than flash tubes, which would allow the sweep time of the rotating mirror to be greater.

It can be seen that the apparatus of FIGURE 1 can be utilized to record an unlimited number of logs on a single recording medium, or several recording mediums could be utilized in side-by-side fashion, through the use of only one recording device as shown in FIGURE 1, in place of a plurality of galvanometer pens or mirrors.

The rotating mirror 31 of FIGURE 1 has been shown driven by a constant speed motor 33 which should provide sufficiently desirable results under most circumstances. However, it may happen that the speed of the downhole investigating apparatus 10 moving through the borehole may be very erratic. In this event, the film would have a high density of exposed area over those portions where the downhole apparatus is moving slowly and would have a dotted form where the investigating apparatus is moving at a fast rate of speed, thus causing a sloppy looking log. Additionally, it would be desirable to utilize the rotating mirror apparatus of the present invention to directly record digital logs in analog form on the recording medium, and also to reduce the "dead time" discussed earlier.

Now looking at FIGURE 3, there is shown apparatus for accomplishing these functions. In the FIGURE 2 apparatus, those elements which perform the same functions as the identically designated elements in FIGURE 1 have the same numerical designations thereof. The derived signals from the downhole investigating apparatus 10 are again supplied to the signal processing circuits 17. The output signal from circuits 17 on conductor 14a is supplied to adding circuit 18, which adds in the bias voltage $E_1$, and then to one of the voltage comparators 50 to which the conductor 15a is also applied.

The shaft 22 from rotating wheel 23 along with moving the recording medium 25 at a rate corresponding to the movement of the cable 12 out of the borehole is supplied through a suitable multiplier gear 51 to a rotating disc device similar to the disc 34 of FIGURE 1. The pulse disc device and shaping circuits 52 of FIGURE 3 represents the light source, disc, photocells, and shaping circuits similar to those shown in FIGURE 1. The output shaft from multiplier gear 51 is also connected to the shaft 53a of a rotating mirror 53 to cause rotation thereof. The rotating mirror 53 is in the shape of a cube whose four sides have reflective surfaces, so as to reduce the "dead time" between sweeps across the recording medium 25. The disc device of FIGURE 3 has two channels and thus there are two corresponding photocells and pulse shaping devices.

Looking at FIGURES 4a and 4b, there are shown the pulses generated from the pulse disc device and shaping circuits 52. FIGURE 4a shows the pulses generated on conductor 54. The interval between pulses on conductor 54 represents one complete revolution of the slotted disc of FIGURE 3. Looking at FIGURE 4b, there are shown pulses generated on conductor 55. Thus by looking at FIGURES 4a and 4b, it can be seen how the slots of the two tracks of the slotted discs of FIGURE 3 would be constructed.

The conductor 55 supplied the count pulses from pulse disc device and shaping circuits 52 to a binary counter 56 which counts the pulses. The output conductors from binary counter 56, which come from the various stages of the counter 56, are supplied to a suitable binary-to-analog converter 57, which could comprise the standard resistor weighting network type of binary-to-analog converter. The output voltage from binary-to-analog converter 57, which takes the form of a ramp voltage in the same manner as in FIGURE 1, is supplied to the voltage comparators 50 for the same purpose as the ramp voltage of FIGURE 1 was applied to voltage comparators 20. That is, when the voltage of the ramp from binary-to-analog converter 57 is equal to a signal voltage input, the particular voltage comparator provides an output signal to a specified one-shot of one-shots 58. The output signal from the particular voltage comparator of voltage comparators 50 which corresponds to the well logging signal $e_1$, is supplied to one-shots 58 through a suitable trigger flip-flop 59 which causes the particular one-shot corresponding to the well logging signal $e_1$ to supply a pulse every other sweep of the recording medium 25. This provides coding of the recorded log of the well logging signals on conductor 15a. The timing of the one-shots 58 also provides coding as in FIGURE 1. The output signals from one-shots 58 are supplied through an OR gate 60 to flash the flash tube 29.

The portions a and b of recording medium 25 are shown in FIGURE 4b as the times when the pulse train on conductor 55 begins and ends respectively. In FIGURE 4b, it can be seen that the pulses of FIGURE 4a corresponding to the pulses on conductor 54 causes the reset of binary counter 56 in readiness for another sweep by the light beam reflected from rotating mirror 53, if present, across the recording medium 25 at the end of each pulse train.

Now concerning the digital portion of the FIGURE 3 apparatus, there are shown two shift registers 61 and 62 which act as counters. The digital information, in binary form, from a suitable digital tape recorder or digital computer (not shown), is supplied via conductor bundles 63 and 64 to suitable gates 65 and 66 respectively. Gates 65 and 66 comprise a plurality of gate circuits, one gate for each conductor. The pulse on conductor 54 from pulse disc device and shaping circuits 52 is supplied to the gates 55 and 66 through a suitable delay and one-shot circuit 67 and causes the digital information from the digital tape recorder or computer to be emptied in parallel form into register counters 61 and 62. Delay and one-shot circuit 67 comprises a delay circuit in series with a one-shot so that each pulse on conductor 54 will be delayed a short time interval and a new pulse of much shorter time deviation generated from the one-shot. The pulse on conductor 54 is also utilized to step the digital tape recorder to the next position (or to control a digital computer), after a suitable delay in delay circuit 69.

The digital count pulses on conductor 55 are supplied to register counters 61 and 62 in serial form, which pulses subtract from the digital information contained within the register counters 61 and 62. Upon all the pulses being emptied from register counters 61 and 62, the carry pulse from each of the register counters 61 and 62 are supplied to their respective one-shots within one-shot circuit 58 to cause the flash tube to flash, as in the previously described manner. Register counters 61 and 62 are reset by the pulses on conductor 54 just prior to the gating of the digital information through gates 65 and 66 into registers 61 and 62 due to the action of delay and one-shot circuit 67.

Looking at the cut-away view on the recording medium 25, there are shown how the exposed areas would look after developing due to one sweep across the film. The separated dots 68 represent the effect that the trigger flip-flop 59 has on the information on conductor 15a, and thus, in effect, dots 68 represent three sweeps across the film.

Referring to FIGURES 4a, 4b, 4c and 4d in conjunction with FIGURE 3, the reset pulse on conductor 54, shown in FIGURE 4a, is the pulse utilized to reset the counters 56, 61 and 62. This pulse on conductor 54 is also the pulse utilized to energize gates 65 and 66 through delay and one-shot 67 so as to gate the digital information from the digital tape recorder or computer to the register counters 61 and 62. This pulse to gates 65 and 66 is shown in FIGURE 4c. The pulse out of delay circuit 69 to step the digital tape recorder is shown as FIGURE 4d. The delay time of delay circuit 69 is such that, regardless of the speed of the investigating apparatus 10 (i.e. speed of shaft 22) the pulse of FIGURE 4d for stepping the digital tape recorder would always be timed properly, since the requirements for this stepping pulse are that it does not interfere with the read-out from the digital tape recorder to the register counters 61 and 62 and it allows sufficient time for the tape recorder to step.

Now, following one cycle of this operation, starting with the point a in FIGURE 4b (left edge of the recording medium in FIGURE 3), a continuous train of count pulses shown in FIGURE 4b are generated on conductor 55. These count pulses are counted by binary counter 56 causing binary-to-analog converter 57 to supply the analog ramp voltage to voltage comparators 50. These count pulses on conductor 55 also empty the contents of the register counters 61 and 62 where the digital information is stored. When the voltage magnitude from binary-to-analog converter 57 equals the voltage magnitude of the different inputs or when the contents of the registers 61 and 62 are emptied, signals are individually supplied to the corresponding one-shots 58 at the individual times when these events occur, to energize the flash tube 29. This train of count pulses is in step with the movement of rotating mirror 53 since the same shaft 22 controls both the mirror 53 and slotted disc and thus the number of pulses generated will always be proportional to the position of mirror 53 relative to the recording medium 25. At the end of the pulse train, the reset pulse on conductor 54 is generated for resetting the counters 56, 61 and 62, gating the digital information into registers 61 and 62, and stepping the digital tape recorder, and the operation begins again. This process is repeated over and over again.

It can now be seen that by utilizing the apparatus of FIGURE 3, analog and digital information can both be recorded in analog form on a recording medium. The digital information can be recorded directly without the need for digital-to-analog conversion. In connection with the recording of the digital information, it would also be possible to have a digital code, such as the excess —3 code, etc., on the disc device wherein the coded digital information could be supplied to a comparator which generates a pulse when the digital number from the coded disc is equal to the digital number which it is desired to record in analog form. In this manner, the register counters 61 and 62 would not be required, since the digital information would already be in a register in the digital tape recorder or computer. It is also seen that by utilizing a multiple-sided mirror as shown in FIGURE 3, the dead time can be cut down to a minimum. The number of sides of this mirror 53 are not limited to four, but could be any desired number of sides.

It can also be seen that by having the rotation of the mirror tied directly to the movement of the downhole investigating apparatus 10 through the borehole, that should the investigating apparatus 10 slow down or stop in the borehole thus causing the movement of the film 25 to do likewise, the rotating mirror 53 will also slow down and the rate of the pulses generated from pulse disc device and shaping circuits 52 on conductor 55 will also slow down to correspond with the rate of sweep of the mirror 53 across the recording medium 25. Thus, the flashes of light impinged on film 25 will always be an equal distance apart, thus providing a sharper looking log of the well logging measurements.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for recording well logging signals comprising:
 (a) means for deriving at least one signal representative of at least one measured characteristic of earth formations traversed by a borehole;
 (b) a recording medium adapted to be moved as a function of borehole depth;
 (c) a light source adapted to be energized;
 (d) a reflective means disposed relative to the light source and the recording medium so that the light from the light source will be adapted to impinge on the recording medium;
 (e) rotatable means for rotating the reflective means so that the light from the light source, if present, will sweep across the recording medium;
 (f) means for generating a signal representative of the rotation of the reflective means; and
 (g) means for energizing the light source upon the generated signal attaining a given relationship with respect to the derived signal so as to provide a record of the derived signal on the recording medium.

2. The apparatus of claim 1 wherein the means for deriving a signal representative of a measured characteristic includes means for moving an investigating means through the borehole and supplying the derived signal representative of the measured characteristic to the surface of the earth for recordation as a function of borehole depth.

3. The apparatus of claim 1 wherein the means for deriving a signal representative of a measured characteristic includes means for playing back a previously recorded log of the measured characteristic as a function of depth.

4. The apparatus of claim 1 wherein the generated signal representative of the rotation of the reflective means is a ramp function having a parameter representative of the position of the reflective means with respect to the recording medium and the means for energizing the light source energizes the light source in response to the ramp function parameter attaining a given relationship with respect to the derived signal.

5. The apparatus of claim 1 wherein the reflective means has a plurality of reflective sides, each side adapted to reflect the light from the light source on the recording medium whereby the dead time between sweeps of the light, if present, across the recording medium will be relatively small.

6. The apparatus of claim 1 and further including means for rotating the rotatable means as a function of borehole depth so that the interval between sweeps across the recording medium will be substantially constant.

7. Apparatus for recording well logging signals comprising:
 (a) means for deriving at least one well logging signal representative of at least one measured characteristic of earth formations traversed by a borehole;
 (b) a recording medium adapted to be moved as a function of borehole depth;
 (c) a light source adapted to be energized;
 (d) a reflective means disposed relative to the light source and the recording medium so that the light from the light source will be adapted to impinge on the recording medium;
 (e) rotatable means for rotating the reflective means so that the light from the light source, if present, will sweep across the recording medium;
 (f) integrator means;
 (g) means coupled to the rotatable means for supplying a signal to the integrator means when the rotatable means is in a given rotational position; and
 (h) means for comparing the integrated signal with the derived well logging signal and energizing the light source upon the integrated signal attaining a given relationship with respect to the derived signal so as to provide a record of the derived signal on the recording medium.

8. Apparatus for recording well logging signals comprising:
 (a) means for deriving at least one well logging signal representative of at least one measured characteristic of earth formations traversed by a borehole;
 (b) a recording medium adapted to be moved as a function of borehole depth;
 (c) a light source adapted to be energized;
 (d) a reflective means disposed relative to the light source and the recording medium so that the light from the light source will be adapted to impinge on the recording medium;
 (e) rotatable means for rotating the reflective means so that the light from the light source, if present, will sweep across the recording medium;
 (f) means coupled to the rotatable means for generating a series of pulses representative of the rotation of the reflective means;
 (g) means for converting the series of pulses to an analog signal representative of the number of generated pulses; and
 (h) means for comparing said analog signal with said well logging signal and energizing the light source upon the analog signal attaining a given relationship with respect to the derived signal so as to provide a record of the derived signal on the recording medium.

9. Apparatus for recording well logging signals comprising:
 (a) means for deriving a plurality of well logging signals representative of characteristics of earth formations traversed by a borehole measured by a plurality of investigating devices;
 (b) a recording medium adapted to be moved as a function of borehole depth;
 (c) a light source adapted to be energized;
 (d) a reflective means disposed relative to the light source and the recording medium so that the light from the light source will be adapted to impinge on the recording medium;
 (e) means for rotating the reflective means so that the light from the light source, if present, will sweep across the recording medium;
 (f) means for generting a signal representative of the rotation of the reflective means; and
 (g) means for energizing the light source each time the generated signal attains a given relationship with respect to each one of the derived well logging signals so as to provide a record of all of the derived signals on the recording medium.

10. The apparatus of claim 9 wherein the means for energizing the light source includes means for coding the energization of the light source to signify which measured characteristic is being recorded.

11. The apparatus of claim 9 and further including means for adding an electrical bias signal to at least one of the derived signals so that different ones of the measured characteristics will be recorded on different channels of the recording medium.

References Cited

UNITED STATES PATENTS

| Re. 25,928 | 12/1965 | Geyer et al. | 340—18 |
| 2,718,449 | 9/1955 | Piety et al. | 346—33 |
| 3,389,403 | 6/1968 | Cottingham et al. | 346—108 |

RICHARD B. WILKINSON, *Primary Examiner.*

JOSEPH W. HARTARY, *Assistant Examiner.*

U.S. Cl. X.R.

340—15.5; 346—108